Jan. 23, 1973 C. R. DRISKELL ET AL 3,713,000

SWEEP GENERATOR WITH AUTOMATIC CENTERING

Filed Nov. 26, 1971 2 Sheets-Sheet 1

Jan. 23, 1973 C. R. DRISKELL ET AL 3,713,000

SWEEP GENERATOR WITH AUTOMATIC CENTERING

Filed Nov. 26, 1971 2 Sheets-Sheet 2

United States Patent Office 3,713,000

Patented Jan. 23, 1973

3,713,000

SWEEP GENERATOR WITH AUTOMATIC CENTERING

Carl R. Driskell, Winter Park, and Joseph R. Owen, Orlando, Fla., assignors to the United States of America as represented by the Secretary of the Navy Filed Nov. 26, 1971, Ser. No. 202,430
Int. Cl. H01j 29/70
U.S. Cl. 315—24 5 Claims

ABSTRACT OF THE DISCLOSURE

An automatically centering variable slope television sweep circuit wherein a variable sync signal delay means initiates output of a voltage variable slope generator at times determined by a closed circuit control means comprising an average output detector and a differential amplifier so that when the slope is changed it does so about its own center.

BACKGROUND OF THE INVENTION

This invention relates to television picture synthesizing systems and more particularly to improved sweep circuitry having provision for automatically centering a target image which is electronically changed in size to simulate changes in range.

Television picture synthesizing systems are used in the art of simulation, for example in a periscope view simulator wherein a closed circuit television camera views a model or picture of a ship, aircraft, or the like and a monitor reproduces an image thereof for viewing by an observer through the eyepiece of a simulated periscope. By changing the relative rates of scan, or stated differently, the relative slopes of the deflection voltages between the camera and the monitor the target image at the monitor can be electronically increased or decreased in size to simulate changes in target range.

Examples of this are found in U.S. Pats. Nos. 3,420,953, 3,497,614, and 3,507,990. It is, of course, desirable to keep the target image centered as it is electronically reduced or increased in size. This has been accomplished by introducing appropriate delays in the initiation of the line or field voltage ramps as the slopes thereof are changed, so that as the slopes change they appear to pivot about stationary center points. The target centering as taught in Pat. No. 3,497,614 requires two complicated, computer generated compensating voltages for each target. Additional computer capacity has been required to compute these functions and additional computer-to-trainer interface equipment is required for each target.

A later target ranging system, which is disclosed in copending application Ser. No. 58,381, filed July 27, 1970, and assigned to the assignee hereof, operates very well for very slow moving targets such as ships but has serious limitations when used for fast moving aircraft targets. The vertical sweep coupling capacitors of that system discharge relatively slowly with the result that when the camera sweep rates are changed rapidly for a fast moving target, there is caused a serious error in the vertical position of the target image. The coupling capacitors must be kept large to couple the low, 60 cycle sweep rate for the vertical camera sweep. Furthermore, undesirably high voltage excursions are required in the initial sweep generation circuits.

SUMMARY OF THE INVENTION

With the foregoing in mind it is a principal object of this invention to provide improved variable slope television sweep generator circuitry including means for automatically centering the voltage ramp (and hence the target image).

It is another important object of this invention to provide an improved variable slope sweep generator having automatic centering for use in target range simulation in a television picture synthesizer system and with which improved generator only one range control voltage need be derived from the picture synthesizer system for each target range function.

Yet another object is the provision of such a sweep generator which is inexpensive in construction and stable in operation, the latter feature being particularly advantageous in that the invention avoids the introduction of target position errors for high speed target simulation such as aircraft.

As another object the invention aims to accomplish the foregoing through the use of inexpensive, reliable solid state circuitry characterized as a novel closed loop control system which can be added to a picture synthesizer system for automatically providing appropriate sweep delays for target centering as range is changed.

The invention may be further said to reside in certain novel combinations and arrangements of parts by which the above stated objects and advantages are achieved, as well as others which will become apparent from the following description of a preferred embodiment when read in conjunction with the accompanying sheets of drawings.

DESCRIPTION OF THE PREFERRED EMBODIMENT

Figure 1:
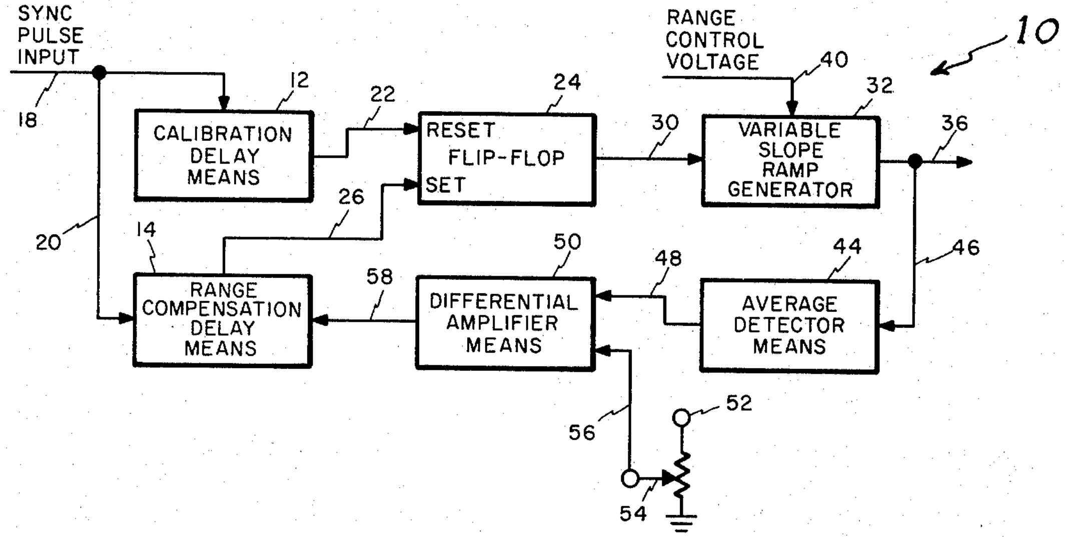
FIG. 1 is a diagrammatic illustration in block form of an automatically centering, variable slope sweep generator circuit embodying the invention.

In the form of the invention illustrated in the drawings and described hereinafter, there is provided a variable slope, automatic centering sweep voltage generating circuit indicated generally at 10. The circuit 10 may be used to generate either the line or field sweep voltage, and it will be understood that a television picture synthesizer system would use two such circuits 10 for each target, one for line and one for field sweep, with only some components requiring different values.

The circuit 10 comprises a calibration delay means 12 and a range compensation delay means 14, both of which receive synchronizing pulses 16 as shown by lines 18 and 20. The sync pulses 16 (see FIG. 2, time line A) are the usual line or frame sync pulses for the picture synthesizing television system in which the circuit 10 is to be used. Henceforth in this example the circuit 10 will be considered to be used for the generation of line sweep voltages for an electrostatic deflection means with self centering.

The calibration delay means 12, which may be a variable delay of any suitable well known type such as a single-shot multivibrator, provides a means for adjusting the synchronizing pulses with respect to the rest of the picture synthesizing system to achieve a maximum active sweep time. The output of the calibration delay means 12, in the form of a first series of delayed sync pulses 16' (see FIG. 2, time line B), is applied as shown by line 22 to the reset terminal of a flip-flop 24.

The range compensation delay means 14, which conveniently comprises a voltage variable single shot multivibrator, provides as its output a second series of delayed sync pulses 16'' (see FIG. 2, time line C) via line 26 to the set terminal of the flip-flop 24. The flip-flop 24 provides rectangular output pulses 28 (see FIG. 2, time line D) on line 30 to a variable slope voltage ramp generator 32, each pulse 28 having a duration determined by the time elapsing between the beginning of a pulse 16'' and the beginning of the next pulse 16'. That is to say, the pulses 28 are initiated by pulses 16'' from the range compensation delay means 14 and terminated by pulses 16' from the calibration delay means 12.

The variable slope voltage ramp generator 32 provides a sweep voltage output on line 36 which comprises a series of voltage ramps 38 (see FIG. 2, time line E), each of which begins with the leading edge 28a of one of the input pulses 28 and terminates to initiate a flyback slope 39 with the trailing edge 28b of the pulse 28.

The slope of each ramp 38 is determined by a range control voltage input to the ramp generator 32 as shown by line 40. The range control voltage on line 40 is an analog input proportional to the target range being simulated and derived in any suitable manner such as from a potentiometer (not shown) at an instructor's console. The slope generator 32 may be of any well known voltage controlled type and may conveniently comprise a circuit such as that described in "Pulse, Digital, and Switching Waveforms" of McGraw-Hill Publishing Company, pages 562–565.

Figure 2:
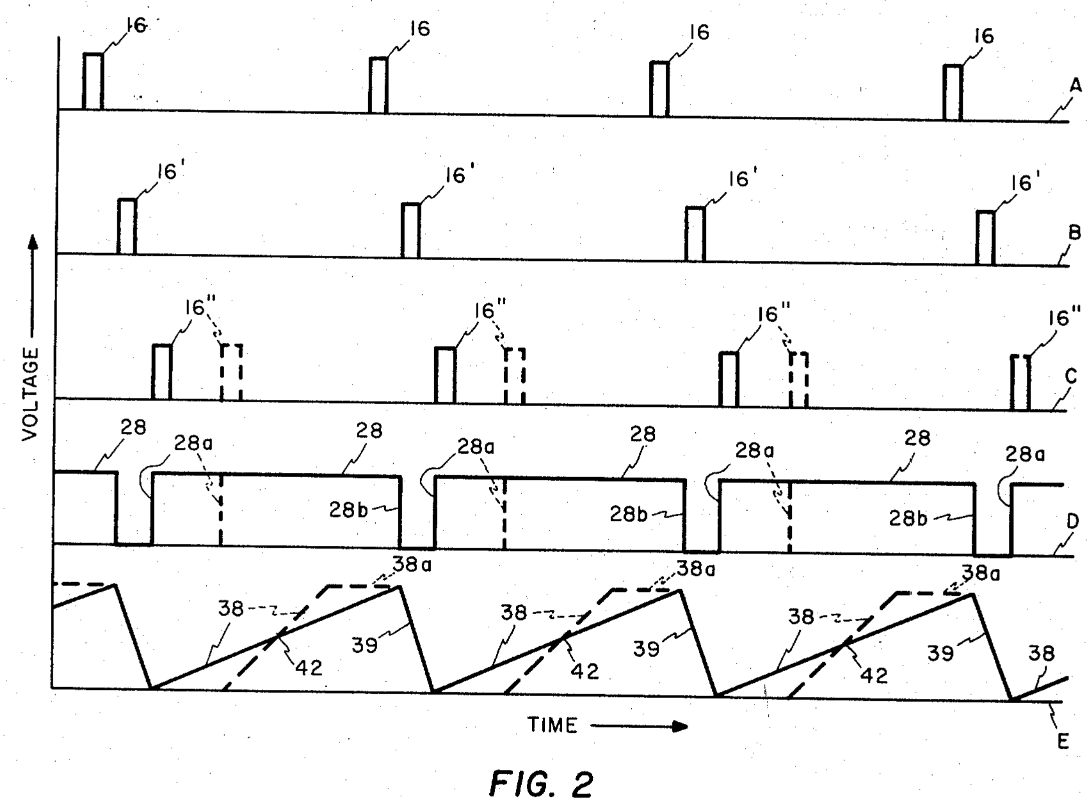
FIG. 2 is a graphic illustration showing the time relationships of various voltages occurring during operation of the circuit of FIG. 1.

It should be noted, however, that the slope generator 32 must be selected to have a maximum or saturation voltage output such that as the slope of the ramp 38 increases from the minimum slope indicated by the full line showing of the ramp in FIG. 2, to some greater slope as shown in dotted lines, a plateau 38a is formed at the maximum voltage level.

In order to maintain the ramp portion 38 of the voltage output on line 36 centered with respect to the center 42 of the minimum slope when the slope of the ramp is changed to change target image size, it is necessary to change the time at which the ramp portion 38 begins. To this end, an average voltage detector 44 is connected as shown by line 46 to receive a portion of the output of generator 32 on line 36. The average voltage detector 44 provides on line 48 a D.C. voltage which is analogous of the average voltage on line 36. This D.C. voltage is applied as one input to a differential D.C. amplifier 50 for comparison to a voltage derived from a suitable source represented by terminal 52 via a calibration potentiometer 54 and line 56.

The output voltage of the differential amplifier 50 on line 58 is representative of the difference, if any, positive or negative, between the output of the average detector 44 and the calibration voltage on line 56. This output of the amplifier 50 is applied as a control voltage to the range compensation delay means 14 and serves to cause the latter to provide the delayed sync pulses 16'' at such times as will tend to result in the ramp portions of the output 38 to be centered. This is illustrated in FIG. 2, wherein the dotted line positions of the sync pulses 16'' are such as to cause the leading edges 28a of the rectangular output pulses 28 from flip-flop 24 to occur at the dotted line positions. Accordingly, the initiation of the dotted line slope 38 is delayed sufficiently to maintain the center thereof at 42.

Figure 3:
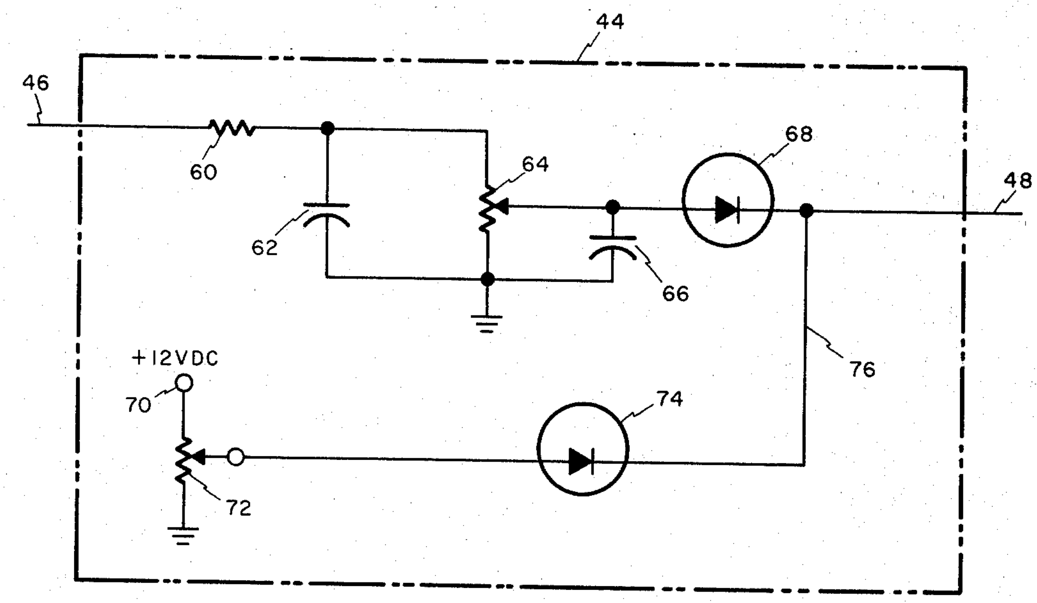
FIG. 3 is a diagrammatic illustration in more detail of the average detector means of the circuit of FIG. 1.

Referring now to FIG. 3, the average voltage detector 44 actually used in a working embodiment comprises a 2,000 ohm input resistor 60 connected to one side of a capacitor 62, the other side of which is connected to ground. Connected across the capacitor 62 is the 10,000 ohm resistance element of a potentiometer 64. The wiper of the potentiometer 64 is connected through a capacitor 66 to ground, and through an isolating diode 68 to the output line 48 of the detector 44.

A clamping voltage is derived from a suitable 12 VDC voltage source, represented by terminal 70, through a calibrating potentiometer 72, the 2,000 ohm resistance element of which is connected between terminal 70 and ground and the wiper of which is connected through a diode 74 and line 76 to the output line 48.

In the present example, wherein the circuit 10 is for line sweep generation, the capacitors 62 and 66 of the detector 44 have values of 10 microfarad and .5 microfarad, respectively. In the same picture synthesizer a similar circuit is used for vertical or field deflection and the detector of the circuit has capacitors corresponding to 62 and 66 having values of 100 microfarad and 10 microfarad, respectively.

Figure 4:
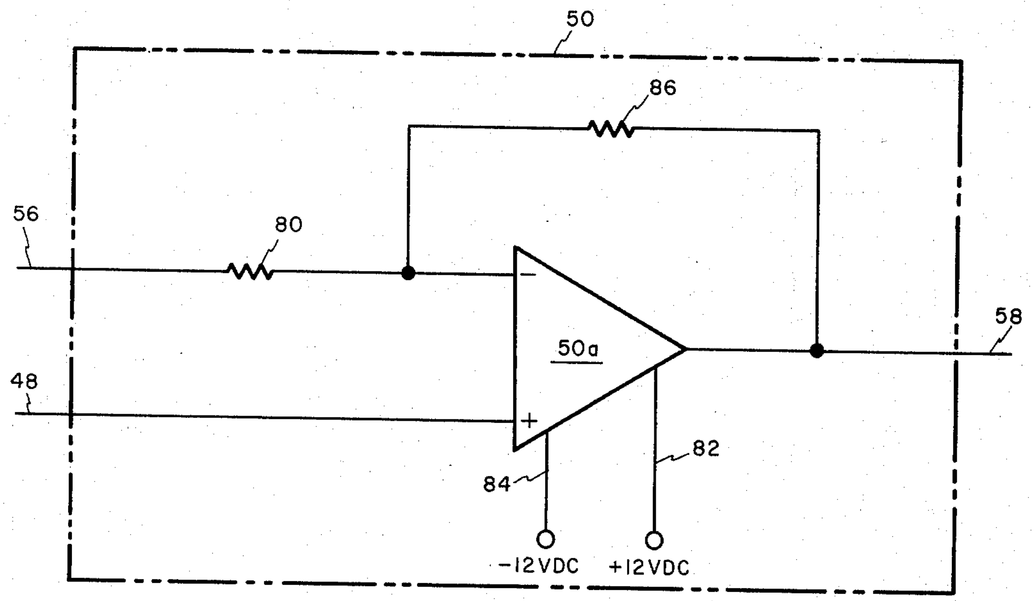
FIG. 4 is a diagrammatic illustration in more detail of the differential amplifier means of the circuit of FIG. 1.

While other differential amplifiers may be used, the amplifier 50 represented in block form in FIG. 1 conveniently comprises a commercially available integrated circuit amplifier unit such as that designated $\mu$a. 741 by Fairchild Industries, Semiconductor Division, Mountain View, Calif. Such a unit is represented at 50a in FIG. 4 wherein the line 48 from the average detector is applied to the positive input terminal of the unit 50a and the reference input via line 56 is connected through a 3,000 ohm resistor 80 to the negative input terminal. Positive and negative supplies are provided as indicated by lines 82, 84. A 100,000 ohm feedback resistor 86 is connected between the output line 58 and the negative input terminal.

In operation, once the circuit 10 has its calibration adjustments achieved so that at a range control input at line 40 corresponding to the minimum range (maximum target image size and minimum slope of ramp 38), a target image on the monitor display may be decreased in its horizontal dimension about its own center simply by changing the range control voltage via line 40. Moreover, because the centering is automatically effected through the feedback loop including average detector 44 and amplifier 50, each of which are very fast acting, there is no noticeable positional errors introduced when changes in range are made rapidly as in the case of aircraft target simulation.

Obviously many modifications and variations of the present invention are possible in the light of the above teachings. It is therefore to be understood that within the scope of the appended claims the invention may be practiced otherwise than as specifically described.

What is claimed is:

1. A television sweep circuit for generating a voltage ramp output at a repetition rate corresponding to a sync pulse input with the slope of each ramp portion of the output being determined by a control voltage input and being automatically centered, said circuit comprising:

calibration delay means for providing a first series of delayed sync pulses;

compensation delay means for providing a second series of delayed sync pulses, said second delay means being voltage variable;

flip-flop means for providing a series of rectangular pulses having leading edges determined by said delayed sync pulses of said second series and trailing edges determined by said delayed sync pulses of said first series;

a variable slope voltage ramp generator for generating said voltage ramp output;

detector means for generating an analog voltage representative of the average voltage of said ramp output;

means for providing a reference voltage;

differential amplifier means for providing an output voltage representative of any difference between said average voltage and said reference voltage; and said compensation delay means being responsive to the output of said differential amplifier means to change the delay of said sync signals of said second series by an amount and in a direction that will provide a voltage ramp output which is centered with respect to said rectangular pulses.

2. A television sweep circuit as defined in claim 1, and wherein:

said ramp generator is responsive to said control voltage to change said slope.

3. A television sweep circuit as defined in claim 2, and wherein:

said means for providing a reference voltage comprises potentiometer means whereby said reference voltage can be selectively varied.

4. A television sweep circuit as defined in claim 3, and wherein:

said detector means comprises a capacitor having one side connected to ground, a capacitor charging resistor connected between said voltage ramp output of said ramp generator and the other side of said capacitor, a potentiometer having its resistance element connected across said capacitor, a diode, and the wiper of said potentiometer being connected through said diode to said voltage variable compensation delay means.

5. A television sweep circuit as defined in claim 4, and wherein:

said detector means further comprises a second capacitor connected between said wiper and ground, a second potentiometer having its resistance element connected between a voltage supply and ground, a second diode, and said second potentiometer having its wiper connected through said second diode to said voltage variable compensation delay means, whereby minimum delay from said compensation delay means may be selected.

References Cited

UNITED STATES PATENTS

| | | | |
|---|---|---|---|
| 3,497,614 | 2/1970 | Petrocelli et al. | 178—7.5 SE |
| 3,551,733 | 12/1970 | Johnson | 315—22 |
| 3,471,743 | 10/1969 | Olsson et al. | 315—24 |
| 3,646,393 | 2/1972 | Tarr | 315—27 TD |

CARL D. QUARFORTH, Primary Examiner

J. M. POTENZA, Assistant Examiner

U.S. Cl. X.R.

315—27 TD; 178—7.5 SE